US010098358B2

(12) United States Patent
Brown et al.

(10) Patent No.: US 10,098,358 B2
(45) Date of Patent: Oct. 16, 2018

(54) STABILISED POTASSIUM BICARBONATE AND LOW-SODIUM LEAVENING COMPOSITIONS

(75) Inventors: Daniel James Brown, Bewdley (GB); Diana Jordan, Kidderminster (GB)

(73) Assignee: KUDOS BLENDS LTD., Worcester (GB)

( * ) Notice: Subject to any disclaimer, the term of this patent is extended or adjusted under 35 U.S.C. 154(b) by 556 days.

(21) Appl. No.: 13/635,538

(22) PCT Filed: Mar. 16, 2011

(86) PCT No.: PCT/GB2011/050519
§ 371 (c)(1),
(2), (4) Date: Nov. 16, 2012

(87) PCT Pub. No.: WO2011/114151
PCT Pub. Date: Sep. 22, 2011

(65) Prior Publication Data
US 2013/0202758 A1     Aug. 8, 2013

(30) Foreign Application Priority Data

Mar. 17, 2010 (GB) .................................. 1004425.3
Jan. 10, 2011 (GB) .................................. 1100316.7

(51) Int. Cl.
*A21D 2/02* (2006.01)
*A21D 2/14* (2006.01)
*A62D 1/00* (2006.01)
*C04B 22/10* (2006.01)
*C04B 28/02* (2006.01)
*A23P 20/10* (2016.01)
*C04B 103/10* (2006.01)

(52) U.S. Cl.
CPC ............... *A21D 2/145* (2013.01); *A21D 2/02* (2013.01); *A21D 2/14* (2013.01); *A23P 20/10* (2016.08); *A62D 1/0014* (2013.01); *C04B 22/106* (2013.01); *C04B 28/02* (2013.01); *A23V 2002/00* (2013.01); *C04B 2103/10* (2013.01); *Y10T 428/2982* (2015.01); *Y10T 428/2991* (2015.01)

(58) Field of Classification Search
USPC ........................................................ 426/551
See application file for complete search history.

(56) References Cited

U.S. PATENT DOCUMENTS

| 4,185,127 | A | | 1/1980 | Radlove |
| 4,514,432 | A | * | 4/1985 | Grzinia .......................... 426/656 |
| 4,938,980 | A | | 7/1990 | Arciszewski |
| 5,225,225 | A | | 7/1993 | Thomas et al. |
| 5,378,279 | A | | 1/1995 | Conroy |
| 5,432,146 | A | | 7/1995 | Winston |
| 5,552,084 | A | | 9/1996 | Lajoie et al. |
| 6,149,960 | A | | 11/2000 | Book et al. |
| 6,312,741 | B1 | | 11/2001 | Navarro |
| 2005/0163904 | A1 | | 7/2005 | Walker et al. |
| 2009/0092727 | A1 | * | 4/2009 | Perlman .................. A23L 1/035 426/548 |
| 2009/0246336 | A1 | * | 10/2009 | Burnett et al. ................. 426/326 |
| 2009/0317531 | A1 | | 12/2009 | Reh |
| 2011/0033413 | A1 | * | 2/2011 | Kwetkat et al. ........... 424/78.03 |

FOREIGN PATENT DOCUMENTS

| CN | 101355882 | 1/2009 |
| EP | 1100338 | 9/2006 |
| EP | 1 797772 | 6/2007 |
| GB | 558490 | 1/1944 |
| GB | 987011 | 3/1965 |
| GB | 1109344 | 4/1968 |
| GB | 1168092 | 10/1969 |
| WO | WO 03/020044 | 3/2003 |

OTHER PUBLICATIONS

International Search Report for PCT Application PCT/GB2011/050519 dated Jun. 19, 2012.
Gibbs et al., "Encapsulation in the food industry: a review," International Journal of Food Sciences and Nutrition, 1999, vol. 50, No. 3, pp. 213-224.
Chinese Office Action dated Apr. 24, 2014 in Chinese Application No. 201180024493.7, including English translation.
Chinese Office Action dated Jun. 24, 2013 in Chinese Application No. 201180024493.7, including English translation.
Chinese Office Action dated Jun. 3, 2015 in Chinese Application No. 201180024493.7, including English translation.
Chinese Office Action dated Nov. 25, 2014 in Chinese Application No. 201180024493.7, including English translation.
Chinese Search Report dated Jun. 18, 2013 in Chinese Application No. 201180024493.7.

* cited by examiner

*Primary Examiner* — Lien T Tran
(74) *Attorney, Agent, or Firm* — RatnerPrestia

(57) ABSTRACT

Potassium bicarbonate is coated with an anionic or amphoteric surfactant, which is preferably a metal soap, such as calcium stearate, to inhibit caking on storage, and premature loss of carbon dioxide when mixed with acidulant, e.g. in a baking powder or self-raising flour blend. Loss of carbon dioxide in the blend may be further inhibited by coating the acidulant with surfactant. Combination of surfactant coating with an inorganic anti-caking agent such as silicon dioxide gives synergistic protection against caking of the potassium bicarbonate. Preferably the bicarbonate has D50 of between 35 and 200μ and is free from particles greater than 400μ.

14 Claims, No Drawings

STABILISED POTASSIUM BICARBONATE AND LOW-SODIUM LEAVENING COMPOSITIONS

CROSS-REFERENCE TO RELATED APPLICATIONS

This application is the U.S. National Phase application of PCT International Application No. PCT/GB2011/050519, filed Mar. 16, 2011, and claims priority of British Patent Application No. 1004425.3, filed Mar. 17, 2010, and British Patent Application No. 1100316.7, filed Jan. 10, 2011, the disclosures of all of which are incorporated herein by reference in their entireties for all purposes.

FIELD OF THE INVENTION

The present invention relates to stabilised potassium bicarbonate, and to low-sodium leavening compositions for use in baking, which comprise potassium bicarbonate.

BACKGROUND OF THE INVENTION

Sodium bicarbonate has traditionally been used as a leavening agent in the bakery industry. However concerns about the health implications of high levels of sodium in the diet have led to moves to develop potassium bicarbonate as an alternative. Normal, unmilled, commercial potassium bicarbonate has a mean particle size (expressed as D50, i.e. the aperture size of a sieve that would retain 50% of the weight of a sample) of about 500μ. This is too coarse for use in dough, giving rise to localised discolouration in the final baked product, known as spotting.

Spotting is a particular problem with products prepared from dough, due to the relatively low mobility of the latter, compared to batter. The former may be defined as a paste, in which the weight of solid exceeds that of liquid, whereas the latter is a fluid in which the weight of liquid exceeds that of solid. Visible spotting in dough products occurs whenever the bicarbonate contains a substantial proportion of particles greater than about 200μ. However we have found that even particles too small to cause visible spotting can give rise to localised concentrations of alkalinity in dough, which adversely affect the storage properties of the end product. To avoid these problems we believe that the bicarbonate should preferably have a very fine particle size, ideally substantially all less than 250μ.

A major problem with finely milled potassium bicarbonate is storage stability. Unlike sodium bicarbonate which is relatively stable at normal temperatures, potassium bicarbonate is hygroscopic, which gives rise to caking on storage. The smaller the particle size the worse the caking, and very finely milled products may become unusable due to caking after only a few hours exposure to atmospheric moisture. The problem is particularly severe in palletised products, parts of which are subject substantial compressive forces. Moreover very finely milled products cause problems with dust.

A further problem is the chemical instability of the product when mixed with an acidulant, e.g. when incorporated into a baking powder blend, or self raising flour. This results in premature release of carbon dioxide on standing at ambient temperatures. This problem is particularly severe in gluten-free products for people with special dietary requirements. We believe that the carbohydrates present in wheat flour tend to inhibit the decomposition of the bicarbonate.

Currently two methods are used commercially to alleviate the first of these problems. According to one of these, which was described in U.S. Pat. No. 5,552,084, potassium bicarbonate for baking is mixed with magnesium oxide. Magnesium oxide reacts with the bicarbonate to form magnesium carbonate on the surface of the particles, which keeps the bicarbonate particles separate. However this approach has several disadvantages. It does not fully overcome all the aforesaid problems. In particular it does not overcome stability problems in baking powder. Moreover, when the treatment is applied to bicarbonate with a fine enough particle size to prevent spotting, the product has a relatively low bulk density, which increases the cost of storage, transport and packaging.

An alternative approach has been to add a dessicant such as silicon dioxide which inhibits caking and preferentially absorbs moisture. However silicon dioxide does not prevent degradation of the bicarbonate in baking powder, and has an adverse effect on the physical properties of the blend. In order to control caking to an acceptable degree, finely divided potassium bicarbonate requires levels of silicon dioxide in excess of those normally used. When such a product is added to baking powder, the powder tends to flow too freely.

In addition to its use in baking, there are a number of other applications of potassium bicarbonate for which a fine particle size is desirable, e.g. in order to improve dispersibility, and to provide a greater surface area and increased catalytic activity. The present invention is therefore relevant to such applications. They include dry chemical fire extinguishers, fungicides, animal feed supplements, polymerisation and dehydrogenation catalysts, effervescers, pH modifiers for, e.g. food or soil, cigarette filters for removing acidic gases from smoke, and as an accelerator for fast drying cement.

It is known generally that coating with an inert encapsulant may stabilise particles against degradation and caking but this technique has significant drawbacks, which have deterred those skilled in the production of potassium bicarbonate leavening agents from considering it as a viable approach to solving the above problems. In particular, effective protection usually requires a relatively large amount of encapsulant, which increases the particle size. Encapsulation often inhibits the activity of the encapsulated product. In addition it usually requires specialised plant and is often expensive to apply.

The prejudice in the art against coating or encapsulation is reflected in U.S. Pat. No. 5,225,225 (Thomas et al), which describes mixing alkali metal bicarbonates with various additives which are designed to provide nucleating sites for the release of carbon dioxide during baking Thomas states that her mixtures do not involve coating the bicarbonate, and stresses the use of non-shearing methods of mixing that will minimise any tendency to coat the substrate.

SUMMARY OF THE INVENTION

We have now discovered that anionic or amphoteric surfactants, and especially metal soaps, provide an effective anti-caking coating for finely milled potassium bicarbonate, which is more cost effective than magnesium oxide and gives products of acceptable bulk density at particle sizes small enough to prevent spotting.

In particular, we have found that in the presence of acidulants, coated bicarbonate provides leavening compositions with improved stability, even in gluten-free products, and also with better flow properties than those containing high levels of silicon dioxide.

All references herein to "coated bicarbonate" refer to potassium bicarbonate to which has been applied at least a partial coating of anionic or amphoteric surfactant sufficient to inhibit the caking of the bicarbonate on storage and/or the degradation of bicarbonate/acidulant blends. This can generally be achieved without the need for total encapsulation.

Surprisingly, unlike most potential protective coating materials, the surfactant coating can provide effective protection without adversely affecting the activity of the bicarbonate in its end use to a significant degree. Moreover the surfactant does not significantly increase the particle size, does not require a high proportion of coating material and is cheap to apply using plant commonly employed in the production of fine particle size potassium bicarbonate. The amount required is not sufficient to affect the taste of the end product.

We have also found that when anionic or amphoteric surfactants are used in conjunction with dessicants such as silicon dioxide, a synergistic effect is obtained, providing a particularly effective protection against caking, using low levels of dessicant, which do not cause unacceptable flow properties in powder formulations.

We have found that the particles may be effectively coated by mixing a finely milled anionic or amphoteric surfactant with the bicarbonate, before, during or after milling of the latter and, if necessary, continuing the mixing in a blender for a sufficient time.

We have further discovered that the stability of bicarbonate/acidulant mixtures may be enhanced by applying the coating of surfactant to the acidulant as well as, or instead of, the bicarbonate.

We have also discovered that potassium bicarbonate of superior stability has a minimum particle size, which is greater than that at which dust becomes a serious problem, but which contains no particles big enough to cause spotting. This may be achieved most conveniently by milling to a D50 just sufficiently high to avoid fines and removing residual particles, coarse enough to cause spotting, by sieving.

DETAILED DESCRIPTION OF THE INVENTION

Our invention therefore provides a composition comprising potassium bicarbonate and optionally an acidulant said composition having a particle size substantially all less than 500μ and at least one of said bicarbonate and said acidulant being coated with an anti-caking agent comprising an anionic or amphoteric surfactant.

According to a preferred embodiment said anti-caking agent comprises: at least one compound of the molecular formula $(RCO_2)_nX$, where: X is an alkaline earth metal, hydrated alkaline earth metal, zinc, aluminium or alkali metal ion; each R, which may be the same or different, is a straight or branched chain alkyl or alkenyl group having from 6 to 30 carbon atoms; and n is the valency of X.

According to a third embodiment said coated potassium bicarbonate has a D50 between 35 and 200μ and is substantially free from particles greater than 400μ.

According to a fourth embodiment the invention provides coated potassium bicarbonate as aforesaid, additionally comprising an inorganic anti-caking agent or dessicant, such as silicon dioxide, tricalcium phosphate, or an alkaline earth metal silicate or carbonate.

According to a fifth embodiment the invention provides a method of preparing coated potassium bicarbonate as aforesaid, which comprises milling potassium bicarbonate to a particle size of less than 500μ, mixing the bicarbonate with an anionic or amphoteric surfactant, or a surfactant forming acid or acid derivative having a particle size less than 50μ, wherein said mixing occurs before or during milling, and/or by stirring the mixture in a blender, subsequent to milling.

According to a sixth embodiment the invention provides a method of making potassium bicarbonate, which comprises milling the bicarbonate to a D50 between 50 and 200μ and sieving to remove at least those particles coarser than 400μ.

According to a seventh embodiment the invention provides the use of potassium bicarbonate as specified in any foregoing embodiment for baking.

According to an eighth embodiment the invention provides a mixture of potassium bicarbonate and an acidulant, at least one of which is coated with anionic or amphoteric surfactant.

According to a ninth embodiment, the invention provides a composition for use in baking comprising coated potassium bicarbonate according to a foregoing embodiment, and an acidulant.

According to a tenth embodiment the invention provides potassium bicarbonate having a D50 between 50 and 130μ substantially free from particles greater than 400μ.

According to an eleventh embodiment, the invention provides a composition for comprising: (i) potassium bicarbonate according to said tenth embodiment and (ii) an acidulant coated with anionic or amphoteric surfactant.

According to a twelfth embodiment the invention provides a method of baking dough using a mixture of potassium bicarbonate and acidulant as specified in, or prepared in accordance with, any preceding embodiment, as a leavening agent.

The invention further provides fire extinguishing powders, cements or catalysts comprising potassium bicarbonate as specified in, or prepared in accordance with, any preceding embodiment.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The coating agent should be substantially dry, that is the moisture content should be less than 1.5%, preferably less than 1%, more preferably less than 0.5%, most preferably less than 0.25% w/w.

For non-food applications a wide range of anionic surfactants may be used. For example it may comprise an alkyl ether sulphate, which is preferably the product obtained by ethoxylating a natural fatty or synthetic alcohol with ethylene oxide, optionally stripping any unreacted alcohol, reacting the ethoxylated product with a sulphating agent and neutralising the resulting alkyl ether sulphuric acid with a base. The alcohol has an average of more than 8, preferably more than 10, more preferably more than 12, but less than 30, preferably less than 25, more preferably less than 20, most preferably less than 15 carbon atoms. It is reacted with an average of at least 0.5, preferably more than 1, but less than 60, preferably less than 50, more preferably less than 25, even more preferably less than 15, more preferably still less than 10, most preferably less than 5 ethyleneoxy groups.

Alkyl ether sulphates may also comprise alkyl glyceryl sulphates, and random or block copolymerised alkyl ethoxy/propoxy sulphates.

The anionic surfactant may also, or alternatively, comprise, for example, alkyl sulphates, alkyl benzene sulphonates, olefin sulphonates, paraffin sulphonates, taurides, isethionates, ether sulphonates, ether carboxylates, sterol lactylates, sarcosinates, aliphatic ester sulphonates e.g. alkyl glyceryl sulphonates, sulphosuccinates or sulphosuccinamates.

The term "amphoteric surfactant" is used herein to include zwitterionic surfactants. They may comprise so-called imidazoline betaines, which are also called amphoacetates, and were traditionally ascribed the zwitterionic formula:

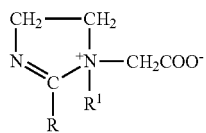

because they are obtained by reacting sodium chloracetate with an imidazoline. It has been shown, however, that they are actually present, at least predominantly, as the corresponding, amphoteric, linear amidoamines:

which are usually obtained commercially in admixture with the dicarboxymethylated form:

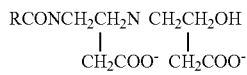

R preferably has at least 8, more preferably at least 10 carbon atoms but less than 25, more preferably less than 22, even more preferably less than 20, most preferably less than 18. Typically R represents a mixture of alkyl and alkenyl groups, obtained, for example, from coconut or palm oil, and having sizes ranging from 8 to 18 carbon atoms, with 12 predominating, or a fraction of such a feedstock, such as lauryl (>90% $C_{12}$).

The zwitterionic surfactant may be a betaine, phosphobetaine or sulphobetaine, e.g. having the formula $R''R'_2NCH_2XOH$, where X is CO, PO or $SO_2$, R' is an aliphatic group having 1 to 4 carbon atoms and R" is an aliphatic group having from 8 to 25 carbon atoms, preferably a straight or branched chain alkyl or alkenyl group, or a group of the formula $RCONR'(CH_2)_n$, where R and R' have the same significance as before, and n is an integer from 2 to 4.

We prefer that R' is a methyl, carboxymethyl, ethyl, hydroxyethyl, carboxyethyl, propyl, isopropyl, hydroxypropyl, carboxypropyl, butyl, isobutyl or hydroxybutyl group.

For food use the choice of surfactant is obviously limited to those which are permitted for food use in the amounts required. The coating is preferably a metal soap of the aforesaid molecular formula. The alkyl or alkenyl group R in the aforesaid formula is preferably an alkyl, most preferably a straight chain alkyl group. R has an average of more than 5, preferably more than 7, still more preferably more than 9, even more preferably more than 11, most preferably more than 13 carbon atoms, but less than 22, most preferably less than 20 carbon atoms.

The anti-caking agent preferably comprises an alkaline earth metal soap, and most preferably calcium and/or magnesium soaps, such as sorbates, octanoates, decanoates, dodecanoates, laurates, myristates, stearates, isostearates, oleates, linoleates, linolenates, ricinoleates, behenates, erucates, palmitates, eicosapentaenoates, docosahexaenoates and mixtures derived from the saponification of coconut oil, palm oil, olive oil or other vegetable oils, fish oil, whale blubber, tallow and/or other animal fats. Alternatively or additionally, the anti-caking agent may comprise a lithium, sodium and/or potassium soap of any of the foregoing. Other soaps that may be used include zinc and aluminium soaps. Potassium soap may be formed in situ, e.g. by milling the potassium bicarbonate with fatty acid or a soap forming derivative thereof, such as an anhydride, acid halide or ammonium soap, under high shear.

The proportion of anti-caking agent is preferably greater than 0.1% by weight, based on the weight of the bicarbonate, more preferably greater than 0.4%, most preferably greater than 0.6%, but less than 5%, more preferably less than 3%, most preferably less than 2%, most preferably less than 1.5%. The optimum proportion of coating agent will be higher for material of smaller particle size, due to the greater surface area of the latter.

It has been found that surfactant coated bicarbonate may undergo caking when compacted e.g. when transported on a pallet. To ameliorate such caking, the anti-caking agent is preferably used in conjunction with an inorganic auxiliary anti-caking agent, or synergist, such as an alkaline earth metal oxide, phosphate, carbonate or silicate, an alkali metal silicate or, preferably, a dessicant such as silicon dioxide. Other auxiliary agents include tricalcium phosphate, calcium or magnesium carbonate, calcium or magnesium silicate or magnesium oxide. The preferred synergist is silicon dioxide. Particularly preferred is fumed silica.

The auxiliary agent is preferably used in a synergistic proportion. Preferably the proportion of auxiliary agent is at least 50% by weight, based on the weight of said anti-caking agent, more preferably at least 100%, even more preferably at least 200% most preferably at least 250%, but less than 500%, more preferably less than 400%, most preferably less than 350%. The amount of auxiliary agent is preferably less than 5% by weight, based on the weight of the bicarbonate, more preferably less than 3%, even more preferably less than 2%, most preferably less than 1.75%, but more than 0.25%, more preferably more than 0.5%, even more preferably more than 1%, most preferably more than 1.25%.

The bicarbonate may conveniently be coated by milling it to the required size in the presence of the anti-caking agent, e.g. using an air classifier mill or more preferably a universal mill, such as a turbine and screen mill. If the amount of shear in the mill is not sufficient to provide the degree of coating required the mixing may be continued in a blender, preferably a high shear blender, until an acceptable level of coating is obtained.

As an alternative to milling the bicarbonate in the presence of the anti-caking agent, the latter may be mixed with freshly milled bicarbonate, in a blender as aforesaid. This may typically take at least 1, preferably at least 2, more preferably at least 3, even more preferably at least 4, most preferably at least 5 minutes. Blending times in excess of 40 minutes are not usually cost effective, and generally we prefer times less than 30 minutes, more preferably less than 25 minutes. "Freshly milled", in this context, means: "after a time insufficient to permit substantial caking to occur". This will obviously depend on the storage conditions. Generally, lower proportions of coating material require greater shearing to provide a sufficient coating. The higher the shear, the less the time required.

An indication of the sufficiency of e.g. a calcium or magnesium soap coating may be obtained by measuring the solution rate of the bicarbonate in water. For example a 5 g sample in an infuser may be immersed in 900 ml gently stirred water at 20° C. The proportion dissolved after a given period of immersion can be determined by titration. The amount left undissolved indicates the effectiveness of the coating. Uncoated potassium bicarbonate dissolves in under 30 seconds. In the case of alkaline earth soaps, we prefer that the coating is sufficient to leave undissolved bicarbonate after 10 minutes. Preferably the proportion by weight of undissolved bicarbonate after 10 minutes is greater than 20%, more preferably greater than 30%, even more preferably greater than 50% most preferably greater than 70%.

The above method is unsuitable for use with alkali metal soaps, on account of their water-solubility. An alternative method of determining the effectiveness of the coating involves measuring the contact angle. This can be adapted for use with alkali metal soaps by recording the addition of a drop of water to the coated powder photographically and determining the maximum angle attained before the coating dissolves. Preferably the contact angle is greater than 90°, more preferably greater than 100°, most preferably greater than 130°.

The bicarbonate is milled to a particle size substantially all less than 500μ. Preferably, in order to avoid visible spotting in batter based products, the particle size is all less than 400μ. To avoid spotting in dough based products we particularly prefer a particle size all less than 250μ, but to avoid impaired shelf life of the end product the particle size is more preferably all less than 200μ, most preferably less than 150μ.

The D50 is preferably less than 200μ, more preferably less than 150μ, even more preferably less than 100μ. However to minimise caking, and avoid excessive dust, we prefer that the D50 is greater than 35μ, more preferably greater than 40μ, even more preferably greater than 50μ, most preferably greater than 60μ.

We have found milling to reduce the D50 to a level sufficient to avoid localised inhomogeneities in dough generally causes caking problems and excessive fines. The product may be milled to a D50 greater than that required to reduce all the coarse particles, and removing the latter by sieving. The sieved particles may be recycled. We particularly prefer to mill to a D50 between 50 and 300μ, and sieve to remove at least those particles greater than 400μ. Preferably the D50 of the milled product prior to sieving is less than 200μ, more preferably less than 150μ, most preferably less than 120μ, but greater than 70, most preferably greater than 90μ. Preferably the product is sieved to remove particles greater than 300μ, more preferably greater than 250μ. We do not exclude the possibility of obtaining the desired particle size directly by selecting a mill with a very narrow size distribution, such as a universal mill, e.g. a turbine and screen mill.

The coated bicarbonate may be incorporated into a baking powder blend. The latter additionally contains an acidulant and also, preferably, a filler such as calcium carbonate, calcium sulphate, flour or starch. The bicarbonate is preferably present in proportions greater than 10% by weight, based on the total weight of the blend, more preferably greater than 20%, most preferably greater than 30%, but preferably less than 70% more preferably less than 50%, most preferably less than 45%.

The acidulant is a compound that reacts with bicarbonate to release $CO_2$. It should meet the same standards for moisture content as the coating material (v.s.). The acidulant preferably has a particle size substantially all less than 400μ, more preferably less than 250μ and most preferably at least 90% by weight less than 100μ. It may for example comprise sodium acid pyrophosphate, sodium aluminium phosphate, mono- and/or di-calcium phosphate, glucono-delta-lactone, citric acid, tartaric acid, sodium and/or potassium citrate and/or tartrate and/or sodium aluminium sulphate.

The acidulant is preferably present in proportions of at least 10% by weight, based on the total weight of the blend, more preferably at least 20%, even more preferably at least 30%, most preferably at least 40%, but preferably less than 75%, more preferably less than 60%, most preferably less than 50%.

For optimum stability the acidulant may be coated with a metal soap, in the same proportions and by the same methods as those described herein for coating the bicarbonate. Preferably the acidulant is stirred for up to forty minutes with the soap in a blender. Coating the acidulant provides substantially similar improvements in stability in the baking powder to coating the bicarbonate, but does not, obviously, avoid the caking problems encountered when storing the latter. If the soap coating is only applied to the acidulant, the particle size of the bicarbonate and the presence of relatively high levels of inorganic dessicant is therefore particularly critical to obtaining optimum stability.

The filler may for example comprise starch, wheat flour, cellulose, dextrin, calcium carbonate and/or calcium sulphate, and is preferably present in a proportion of at least 2% by weight, based on the total weight of the blend, more preferably at least 5%, even more preferably at least 10%, most preferably at least 15%, but preferably less than 50%, more preferably less than 30%, most preferably less than 20%.

The blend may additionally comprise other, conventional ingredients including:
   Oil, e.g. vegetable oil, such as olive oil or corn oil, mineral oil, silicone oil, glycerol, and/or poly glycerol ricinoleate in proportions up to 5% by weight, preferably up to 2%, more preferably up to 1%;
   Preservatives such as calcium propionate or potassium sorbate, in effective proportions, preferably greater than 2%, more preferably greater than 5% by weight, but preferably less than 15%, more preferably less than 10%;
   Salt, such as sodium and/or potassium chloride in proportions usually up to 35% by weight, preferably up to 30%, more preferably up to 20%, most preferably up to 15%, and typically at least 2%, preferably more than 5% most preferably more than 10%;
   Acidity regulators such as the lecithin, sodium, potassium, magnesium and/or calcium salts of lactic, citric, acetic, tartaric, adipic, ascorbic, malic and/or lactobionic acid, oxystearin and or lecithin, in proportions up to 10% by weight, preferably greater than 1%, more preferably greater than 2%, most preferably greater than 3%, but preferably less than 8%, more preferably less than 7%, most preferably less than 6%;
   Anti-caking agents such as silicon dioxide, alkali metal and/or alkaline earth metal silicates and/or any of the anti-caking agents, which may be used as aforesaid to form coatings according to the invention, in proportions up to 5% by weight; and/or Sweeteners, such as sucrose or glucose, flavourings, fragrances and/or colourings, as desired.

The coated bicarbonate of the invention may also be incorporated into self-raising flour. The latter may for example comprise at least 0.5% by weight of baking powder, preferably at least 1%, more preferably at least 2%, most preferably at least 5%, but less than 15%, more preferably less than 10% most preferably less than 8%.

The coated potassium bicarbonate of the invention may be used as or as part of a powder fire extinguishing or retarding composition for spraying directly onto fires, which decompose it to form a carbon dioxide blanket over the fire. It may be used in conjunction with other components of fire extinguishing or retarding powders such as barium, calcium or ammonium sulphate, diammonium phosphate, alkali metal gluconate or mica.

The coated bicarbonate of the invention may be used as a catalyst in quick drying cement, or in chemical processes such as dehydrogenation or polymerisation, or as an effervescer or pH modifier, for example in food, drinks, animal foodstuffs, soil treatment and in antacid preparations.

The invention will be illustrated by the following examples in which all proportions are percent by weight based on the total weight of the composition unless stated otherwise, the calcium soap was "LIGA" ® calcium stearate CPR-2-V and the magnesium soap was "LIGA" magnesium stearate MF-3-V, each comprising a 3:2 by weight mixture of stearate and palmitate obtained from saponified vegetable oil. Unless stated to the contrary, the silicon dioxide was amorphous.

EXAMPLES

Example I

Potassium bicarbonate having D50 of 500μ was milled to two granularities, having D50 of 150 and 35μ respectively in an air classifier mill, and mixing continued in a high shear blender for 5 minutes. The preparations were repeated in admixture with 0.5% food grade calcium soap. The products were subjected to an accelerated ageing test at 20° C. and a controlled relative humidity of 70%. After 96 hours both uncoated samples had agglomerated into a dry cake. The two coated samples were both free flowing powders.

Example II

A baking powder was prepared by mixing 36% of the 35μ coated potassium bicarbonate of Example I, 42% disodium pyrophosphate and 22% starch. The powder was more stable, and had superior flow properties compared to a powder containing uncoated bicarbonate mixed with 3% silicon dioxide, based on the weight of bicarbonate.

Example III

The baking powder of Example II was used in the following recipe:
100 g—Plain flour (10 to 15% moisture)
5.5 g—Baking flour
1.55 g—Sodium chloride
5.5 g—Buttermilk powder
19.3 g—Castor sugar
25.0 g—Butter
7.8 g—Egg
42 g—Water All dry ingredients were weighed and sieved into a mixing bowl and blended for 1 minute. The butter was slowly added in small lumps and beaten for 5 minutes. The liquids were added over 15 seconds and the mixture beaten for 15 seconds and then blended with a dough hook for 1 minute. The floured dough was placed on a floured surface, rolled out and cut into 2 inch circles, which were baked at 220° C. for 16 minutes. The scones were free from visual spotting and were in specification for shape and size. There was no effect on flavour detectable.

Example IV

Potassium bicarbonate was fed at a rate of 110 kg/hr to an air classifier mill (ACM40) operating at 1000 rpm with half the pins of the pin router out. Calcium soap was simultaneously fed at a rate of 14.4 kg/hr. A sample from the top of the second of three bags recovered from the trial had a D50 of 86μ and a soap content of 0.3%.

Three 15 g samples of this material were taken, the second and third of which were mixed with 0.5% and 1.5% respectively of silicon dioxide. A fourth, comparative sample consisted of uncoated potassium bicarbonate, D50 35μ, with 3% silicon dioxide.

Each of the samples was sieved into a Petri dish and exposed to a controlled atmosphere 25° C. and 62% relative humidity for three days. The degree of caking was observed and recorded in Table I

TABLE 1

| | |
|---|---|
| Sample 1 (coated, no dessicant) | Moderate caking |
| Sample 2 (coated, 0.5% dessicant) | Moderate caking |
| Sample 3 (coated, 1.5% dessicant) | Little caking |
| Sample 4 (uncoated, 3% dessicant) | Fully caked |

Example V

Three samples of potassium bicarbonate, each having a D50 of 90μ, were kept in a sealed jar for two hours after milling, and then inspected. The first sample was uncoated and was visibly very lumpy. The other two samples had been coated by mixing for 1 minute in a blender with, respectively 0.5% and 1% by weight sodium dodecylbenzene sulphonate having a D50 of 43μ. Both the coated samples were free flowing and neither showed any evidence of caking.

Example VI

In the following example the control in each case was potassium bicarbonate having a D50 between 35 and 40μ prepared by milling granular bicarbonate, and containing 3% amorphous silicon dioxide. Modified bicarbonate had a D50 between 95 and 120μ and was prepared by mixing granular bicarbonate with the additive for 1 minute in a liquidiser, sieving to remove particles greater than 250μ and mixing for 30 minutes in a blender. Additives used were 1% calcium soap, 2% calcium soap, 1% magnesium soap, 2% magnesium soap and 3% silicon dioxide. The bicarbonate was then mixed with sodium acid pyrophosphate and filler in the weight ratio 2:2:1. The filler was low moisture wheat flour or, for gluten-free recipes, calcium carbonate. The resulting baking powder was then analysed for carbon dioxide before and after storage in a humidity cabinet at 25° C. and 62% relative humidity, for up to 7 hours.

Comparisons were also made with formulations containing modified sodium acid pyrophosphate prepared by mixing the pyrophosphate with calcium or magnesium soap in a blender for thirty minutes. Table II summarises the results:

TABLE II

| Trial | Sample (gluten free trials) | Flow | % CO$_2$ (Chittick) loss | Sample (non-gluten free trials) | | % CO$_2$ (Chittick) loss |
|---|---|---|---|---|---|---|
| 1 | Control | Severe caking | 9.5 | Control | Severe caking | 12.5 |
|  | KHCO$_3$ + calcium soap CaCO$_3$ SAPP | Slight caking | 4.4 | KHCO$_3$ + calcium soap wheat flour SAPP | No caking | 1.9 |
|  | KHCO$_3$ + SiO$_2$ CaCO$_3$ SAPP | Moderate caking | 7.6 | KHCO$_3$ + SiO$_2$ wheat flour SAPP | Moderate caking | 6.7 |
| 2 | Control | Severe caking | 10.9 | Control | Severe caking | 10.8 |
|  | KHCO$_3$ + SiO$_2$ CaCO$_3$ SAPP + calcium soap | No caking | 3.3 | KHCO$_3$ + SiO$_2$ wheat flour SAPP + calcium soap | Free flowing | 2.8 |
|  | KHCO$_3$ + calcium soap CaCO$_3$ SAPP + calcium soap | No caking | 3.7 | KHCO$_3$ + calcium soap wheat flour SAPP + calcium soap | Free flowing | 3.3 |
| 3 | Control | Severe caking | 10.6 | Control | Moderate caking | 11.3 |
|  | KHCO$_3$ + calcium soap CaCO$_3$ SAPP | No caking | 4.8 | KHCO$_3$ + SiO$_2$ wheat flour SAPP + calcium soap | Free flowing | 4.1 |
|  | KHCO$_3$ + magnesium soap CaCO$_3$ SAPP | No caking | 6 | KHCO$_3$ + SiO$_2$ wheat flour SAPP | Moderate caking | 9.7 |
| 4 | Control | Severe caking | 10 | Control | Severely caked | 16.4 |
|  | KHCO$_3$ + SiO$_2$ CaCO$_3$ SAPP + calcium soap | Slight caking | 4.8 | KHCO$_3$ + SiO$_2$ wheat flour SAPP + calcium soap | Free flowing | 2.1 |
|  | KHCO$_3$ + SiO$_2$ CaCO$_3$ SAPP + magnesium soap | Moderate caking | 7.8 | KHCO$_3$ + calcium soap wheat flour SAPP | Free flowing | 1.5 |

Example VII

Real time tests were carried out to determine the effect on shelf life obtained by coating various components of gluten-free baking powder with calcium stearate. The test involved keeping/kg samples in wax lined paper bags secured by cable clips in a store room. The product specification requires a minimum of 23% by weight carbon dioxide. The baking powder comprised potassium bicarbonate, which had been premixed with 3% by weight SiO2, based on the weight of the bicarbonate, sodium acid pyrophosphate and calcium carbonate, which were each present in the same proportions as in Example VI. The control, with all components uncoated, had a shelf life of approximately 1 week. A product with only the bicarbonate coated with 0.6% stearate had a shelf life of about 4 weeks. A product with the same coated bicarbonate and with the acidulant and the calcium carbonate each coated with 1% stearate had a shelf life of about 6 weeks.

Example VIII

The solution rate of potassium bicarbonate, comprising 3% SiO$_2$ and D50 35μ was compared with those of a similar material coated with various proportions of calcium or magnesium stearate by milling in an air classifier mill. 5 g samples were each immersed in 900 ml stirred water at 8° C. in an infuser for ten minutes and the dissolved material determined by titration. The relative degree of coating was determined by subtraction. The results are set out in table III.

TABLE III

| COATING | % UNDISSOLVED |
|---|---|
| None | 0 |
| 0.6% calcium stearate | 29 |
| 0.15% calcium stearate | 61 |
| 0.24% calcium stearate | 63 |
| 0.27% calcium stearate | 65 |
| 0.47% calcium stearate | 79 |
| 0.12% magnesium stearate | 64 |

Example IX

Coated potassium bicarbonate was prepared by milling coarse bicarbonate in an air classifier mill with various proportions of magnesium or calcium stearate. Using the procedure of Example VIII, the solution rate at 11° C. was compared to that of similar samples that had been subjected to an additional 5 minutes post blending by shaking, either alone, or with addition of 1.5% silicon dioxide. The results are shown in table IV.

TABLE IV

| | % Undissolved | | |
|---|---|---|---|
| Coating | No Post-Blending | Post-Blended | Post-Blended + SiO$_2$ |
| 0.12% magnesium stearate | 45 | 73 | 42 |
| 0.27% calcium stearate | 48 | 77 | 65 |
| 0.47% calcium stearate | 71 | 89 | 84 |

Example X

The solution rate of sodium acid phosphate coated with 1% calcium stearate was compared with the uncoated material, using the procedure of Example VIII, with the water temperature at 20° C. The uncoated material dissolved in under 30 seconds. After 5 minutes 61% of the coated material remained undissolved.

Example XI

Potassium bicarbonate with D50 35-40µ containing 3% silicon dioxide was stored for 4 months in a wax lined bag and then compacted for 4 months under a pressure of 1.7 tonnes. The product was very lumpy. A similarly stored and compacted sample (D50=103µ) coated with 1.5% magnesium stearate by blending for 15 minutes in a ploughshare blender was a hard block, but a sample coated with 1.5% magnesium carbonate and containing 1.5% silicon dioxide was very free flowing with a few, friable lumps.

Example XII

Two samples of potassium bicarbonate (A and B), having D50 respectively 102µ and 62µ, each coated with 1% calcium stearate, and one sample (C) of D50 90µ coated with 1% sodium stearate, were each placed on a glass slide and gently compressed with a second slide to form an even surface. Contact angles were measured (based on ASTM D7334) using a Kruss DSA 10 apparatus and distilled water.

The results, based on images recorded after one second, and one minute were:

TABLE V

| | After 1 s | After 1 m |
|---|---|---|
| A | 146° | 140° |
| B | 141° | 134° |
| C | 116° | dissolved |

Thus, surprisingly, all the stearates, including the water soluble sodium stearate, provided a hydrophobic)(>90°) coating initially. In all cases the contact angle fell with time in the presence of liquid water. Sodium stearate became hydrophilic in 15 s.

Example XIII

Samples of potassium bicarbonate (D50=500µ) were blended with 2.5% by weight each of various anti-caking agents, comprising calcium stearate, amorphous silicon dioxide, fumed silicon dioxide and mixtures of calcium stearate with amorphous or fumed silicon dioxide. The samples were then milled to a D50 of approximately 100µ and poured into a measuring cylinder to determine the aerated bulk density. The samples were then compacted by tapping the cylinder, and the tapped bulk density was recorded in Table VI.

TABLE VI

| Sample | Bulk Aerated Density (g/cm$^3$) | Density after 150 Taps | Δ% from SiO$_2$ Bulk Density | Δ% from SiO$_2$ Tapped Density |
|---|---|---|---|---|
| 2.5% Fumed SiO$_2$ | 0.69 | 0.85 | — | — |
| 2.5% Amorphous SiO$_2$ | 0.74 | 0.95 | — | — |
| 0.5% stearate | 0.93 | 1.18 | — | — |
| 0.5% stearate + 2% fumed SiO$_2$ | 0.8 | 1.08 | 16 | 27 |
| 0.5% stearate + 2% amorphous SiO$_2$ | 0.87 | 1.18 | 18 | 24 |
| 1.0% stearate | 1.00 | 1.29 | — | — |
| 1.0% stearate + 1.5% fumed SiO$_2$ | 0.83 | 1.11 | 20 | 31 |
| 1.0% stearate + 1.5% amorphous SiO$_2$ | 0.85 | 1.18 | 15 | 24 |
| 1.5% stearate | 1.00 | 1.29 | — | — |
| 1.5% stearate + 1% fumed SiO$_2$ | 0.89 | 1.18 | 29 | 39 |
| 1.5% stearate + 1% amorphous SiO$_2$ | 0.93 | 1.21 | 26 | 27 |

The invention claimed is:

1. Potassium bicarbonate comprising potassium bicarbonate particles, wherein substantially all of said potassium bicarbonate particles have a particle size less than 500µ, and said potassium bicarbonate particles are coated with a layer of a substantially dry anionic surfactant selected from the group consisting of soaps and alkyl benzene sulphonates, said layer having a contact angle of at least 90°.

2. The potassium bicarbonate according to claim 1, wherein said surfactant comprises at least one soap of a metal selected from the group consisting of alkali metals and alkaline earth metals.

3. A composition according to claim 1, wherein said surfactant comprises at least one compound of the molecular formula $(RCO_2)_nX$, wherein:
- X is selected from the group consisting of alkaline earth metal, hydrated alkaline earth metal, zinc, aluminium and alkali metal ions;
- each R, which may be the same or different, is selected from the group consisting of straight and branched chain alkyl or alkenyl groups having from 6 to 25 carbon atoms; and
- n is the valency of X.

4. The potassium bicarbonate according to claim 1, wherein said surfactant is present in an amount less than 5% by weight based on the weight of the coated potassium bicarbonate particles.

5. The potassium bicarbonate according to claim 1, wherein said potassium bicarbonate particles have a D50 ranging from 35 and 200μ, and are substantially free from particles greater than 400μ.

6. The potassium bicarbonate according to claim 1, wherein said potassium bicarbonate particles have a D50 greater than 50μ.

7. The potassium bicarbonate according to claim 2, wherein the surfactant comprises a soap of a metal selected from the group consisting of sodium and potassium.

8. The potassium bicarbonate according to claim 1, wherein said surfactant is present in conjunction with from 0.25 to 5% of silicon dioxide based on the weight of sodium bicarbonate.

9. The potassium bicarbonate according to claim 8, wherein the weight of silicon dioxide is from 50% to 500% by weight based on the weight of surfactant.

10. The potassium bicarbonate according to claim 1, wherein the contact angle is greater than 100°.

11. The potassium bicarbonate according to claim 1, further comprising a filler.

12. A leaving composition comprising the potassium bicarbonate according to claim 1 and an acidulant.

13. The composition according to claim 12, wherein the acidulant comprises at least one member selected from the group consisting of sodium acid pyrophosphate, sodium aluminium phosphate, mono- and di- calcium phosphate, glucono-delta-lactone, citric acid, tartaric acid, sodium and potassium citrate and tartrate, and sodium aluminium sulphate.

14. The composition according to claim 12, wherein the acidulant is present in an amount from 10 to 75% by weight based on the total weight of the mixture.

* * * * *